United States Patent
Zack et al.

(10) Patent No.: US 6,988,080 B2
(45) Date of Patent: Jan. 17, 2006

(54) AUTOMATED SECURITY AND REORDER SYSTEM FOR TRANSPONDER TAGGED ITEMS

(76) Inventors: Robert E. Zack, 25072 Alicia Dr., Dana Point, CA (US) 92629; Sandra K. Stephens, 25072 Alicia Dr., Dana Point, CA (US) 92629; Marshall K. Dobry, 635 N. Fuller Ave., Los Angeles, CA (US) 90036; Diane M. Berglund, 635 N. Fuller Ave., Los Angeles, CA (US) 90036

(*) Notice: Subject to any disclaimer, the term of this patent is extended or adjusted under 35 U.S.C. 154(b) by 627 days.

(21) Appl. No.: 09/785,745

(22) Filed: Feb. 16, 2001

(65) Prior Publication Data

US 2003/0018534 A1 Jan. 23, 2003

(51) Int. Cl.
G06F 17/60 (2006.01)

(52) U.S. Cl. .................................. 705/28; 705/22
(58) Field of Classification Search ............ 705/22, 705/28
See application file for complete search history.

(56) References Cited

U.S. PATENT DOCUMENTS

| | | | |
|---|---|---|---|
| 4,222,043 A | 9/1980 | Malavasi | 340/568 |
| 4,337,462 A | 6/1982 | Lemelson | 340/572 |
| 4,636,950 A | 1/1987 | Caswell et al. | 364/403 |
| 4,962,369 A | 10/1990 | Close | 340/572 |
| 5,151,684 A | 9/1992 | Johnsen | 340/572 |
| 5,648,765 A | 7/1997 | Cresap et al. | 340/825.35 |
| 5,686,902 A | 11/1997 | Reis et al. | 340/825.54 |
| 5,815,114 A | 9/1998 | Speasl et al. | 342/357 |
| 5,920,261 A * | 7/1999 | Hughes et al. | 340/568.8 |
| 5,936,527 A | 8/1999 | Isaacman et al. | 340/572.1 |
| 5,939,984 A | 8/1999 | Brady et al. | 340/572.1 |
| 5,952,918 A | 9/1999 | Ohayon | 340/539 |
| 5,959,530 A | 9/1999 | Lupien, Jr. et al. | 340/568.1 |
| 5,959,568 A | 9/1999 | Woolley | 342/42 |
| 5,963,131 A | 10/1999 | D'Angelo et al. | 340/568.1 |
| 5,963,134 A | 10/1999 | Bowers et al. | 340/572.1 |
| 5,990,791 A | 11/1999 | Andreasen et al. | 340/572.1 |
| 6,075,443 A | 6/2000 | Schepps et al. | 340/573.4 |
| 6,233,409 B1 * | 5/2001 | Haines et al. | 399/10 |
| 6,563,417 B1 * | 5/2003 | Shaw | 340/10.1 |
| 6,568,596 B1 * | 5/2003 | Shaw | 235/462.01 |
| 6,753,830 B2 * | 6/2004 | Gelbman | 345/55 |

FOREIGN PATENT DOCUMENTS

GB    2271692 A  *  4/1994

OTHER PUBLICATIONS

Article "Packagers think outside the box" May 2001, by Rick Gurin, (www.frontlinemagazine.com website) (4 pages).

* cited by examiner

*Primary Examiner*—Michael Cuff
(74) *Attorney, Agent, or Firm*—Stetina, Brunda, Garred, Bruckner

(57) ABSTRACT

An automated security and reorder system for items maintained within a boundary. Each item has an associated transponder which is configured to transmit item identification data for indicating a secured status and a consumable status of the associated item. The system has a transponder communications device configured to electrically interrogate a transponder. The system has a controller which is configures to generate an alert signal in response to detection of a given transponder having crossed the boundary and having item identification data indicating a secured status of the associated item. The controller generates an item recorder signal in response to detection of a given transponder having crossed the boundary and having item identification data indicating a consumable status of the associated item. The system has a database for receiving item reorder signals from the controller for generating an electronic shopping list for reordering of items.

28 Claims, 1 Drawing Sheet

AUTOMATED SECURITY AND REORDER SYSTEM FOR TRANSPONDER TAGGED ITEMS

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to item inventory, and more particularly to a system and method for automatically securing and reordering transponder tagged items.

Over recent years, two particular topics have been the focus of attention. One of these topics is the efficient tracking of items utilizing transponders. Such transponders may take the form of passive radio frequency devices. For example, a prior art arrangement in the merchandise tracking context is disclosed in U.S. Pat. No. 5,151,684 to Johnsen entitled "ELECTRONIC INVENTORY LABEL AND SECURITY APPARATUS". Another example of a prior art arrangement is in the library book tracking context and is disclosed in U.S. Pat. No. 5,963,134 to Bowers et al. entitled "INVENTORY SYSTEM USING ARTICLES WITH RFID TAGS". Such prior art arrangements utilize transponders, also referred to as RFID tags, to track items in relation to a given area and to issue an alarm when an item with a transponder is removed from such area without being purchased in the case of merchandise or checked-out in the case of library books.

The other topic of attention is the rapid growth of the global computer network (i.e., the Internet) and the increasing level of influence it is having on virtually every facet of everyday life. A cursory scan of television programming, magazines or newspapers on almost any given day demonstrates how the Internet is becoming a tool of steadily increasing importance for both business and personal activities. Those individuals who turn to the Internet to satisfy traditional consumer based shopping needs are often described as participating in "e-commerce".

BRIEF SUMMARY OF THE INVENTION

In accordance with an embodiment of the present invention, there is provided an automated security and reorder system for items maintained within a boundary. Each item has an associated transponder, and each transponder is configured to transmit item identification data for indicating a secured status and a consumable status of the associated item. The transponders are preferably passive radio frequency devices which are read-writeable. The system is provided with a transponder communications device configured to electrically interrogate a transponder associated with an item maintained within the boundary and to receive item identification data in response. The transponder communications device may include multiple devices. The system is further provided with a controller which is disposed in operable communication with the transponder communications device. The controller is configured to generate an alert signal in response to detection of a given transponder having crossed the boundary and having item identification data indicating a secured status of the associated item. The controller is further configured to generate an item reorder signal in response to detection of a given transponder having crossed the boundary and having item identification data indicating a consumable status of the associated item. The controller may be configured to detect a given transponder having crossed the boundary by either receiving a response from the transponder or a failure to receive such a response. The system is further provided with a database for receiving item reorder signals from the controller for generating an electronic shopping list for reordering of items.

The system is contemplated to be flexible in terms of various system configurations. For example, the controller and database may each be physically located at different locations. Thus, the controller may be hosted by a personal computer disposed adjacent the boundary. In this regard, the system may further include an external communications device disposed in electrical communication with the controller for transmitting generated alert and reorder signals therefrom. The generated alert and reorder signals may conveniently be transmitted via a global computer network. In another embodiment of the present invention, the controller is hosted remotely by an external host computer. In this regard, an external communications device may be disposed in electrical communication with the transponder communications device for transmitting a signal representative of the item identification data to the controller. Similarly, the database may be hosted in a variety of locations including by a personal computer disposed adjacent the boundary or remotely by an external host computer. Moreover, the controller and database may be distributed in nature, existing in several components at different locations. In addition, the system may be configured to track the items in relation to multiple boundaries and that the alert and item reorder signal may be generated in response to detection of the transponder tagged items having crossed selected ones of the boundaries.

Advantageously, the controller may be in operable communication with security devices, such as a camera and an alarm which are disposed adjacent the boundary. In this regard, the controller may be configured to activate such security devices in response to receipt of the alert signals. Further, the system may include a transponder programming device configured to transmit electrical signals to the transponders for updating the item identification data thereof.

In another embodiment of the present invention, there is provided an automated method of securing and reordering items maintained within a boundary. Each item has an associated transponder and each transponder is configured to transmit item identification data for indicating a secured status and a consumable status of the associated item. The method includes establishing a transponder data link between the transponders and a transponder communications device located adjacent the boundary. The transponders are electrically interrogated and item identification data is received in response via the transponder data link. An alert signal is generated in response to detection of a given transponder having crossed the boundary and having item identification data indicating a secured status of the item associated therewith. An item reorder signal is generated in response to detection of a given transponder having crossed the boundary and having item identification data indicating a consumable status of the item associated therewith. The item reorder signal may be transmitted via a global computer network. Preferably, an electronic shopping list is generated based upon the received item reorder signals. The electronic shopping list may be conveniently accessed and transmitted via a global computer network.

As such, based on the foregoing, the present invention mitigates the inefficiencies and limitations associated with prior art methods and systems. Because of the many advantages of transponder technology, in terms of detection and information storage capacity, including read-write capability, transponders have the potential to become widely acceptable much the same as universal bar codes have been utilized over the last several decades. Transponders allow for passive detection, in that a user is not required to actively participate in the scanning of the device as in the case of bar codes, for example.

The system and method of the present invention advantageously utilizes transponder technology for multiple purposes within a given environment. As discussed above, the system provides for the automatic tracking of transponder tagged items to and from the designated boundary or even boundaries. Significantly, the transponders include identifying information as to whether a given item is of a consumable nature. For example, the system may be deployed in a home environment, with designated items having a consumable status such as specific food items, paper towels, soap, light bulbs, etc. In this regard, a detection event that such items have crossed a particular boundary may be used to trigger the automatic addition of a similar item onto an electronic shopping list for reordering.

At the same time that the present system is utilized for item reordering purposes, the present invention recognizes that the detection of transponders may be used for another purpose, to track valuable items that are not intended to leave the premises or boundary. In the home environment, certain items which may be tagged and monitored for this purpose may include appliances, furniture and other valuables. For example, while the items stored in a refrigerator may be tracked and classified as being a consumable, the refrigerator itself may be affixed with a transponder having a secured status. Thus, the detection of an unauthorized removal of a tagged item may be used to trigger an alarm or even may be electronically linked to traditional alarm or security systems. Further, the transponders may be selectively placed in relation to an associated item so as to conceal the transponder. In this regard, it is contemplated in the event a tagged item is stolen or otherwise removed, the transponder may be useful for identification or verification of ownership of later recovered stolen property.

Accordingly, the present invention represents a significant advance in the art.

BRIEF DESCRIPTION OF THE SEVERAL VIEWS OF THE DRAWING

These, as well as other features of the present invention, will become more apparent upon reference to the drawings wherein.

DETAILED DESCRIPTION OF THE INVENTION

Figure 1:
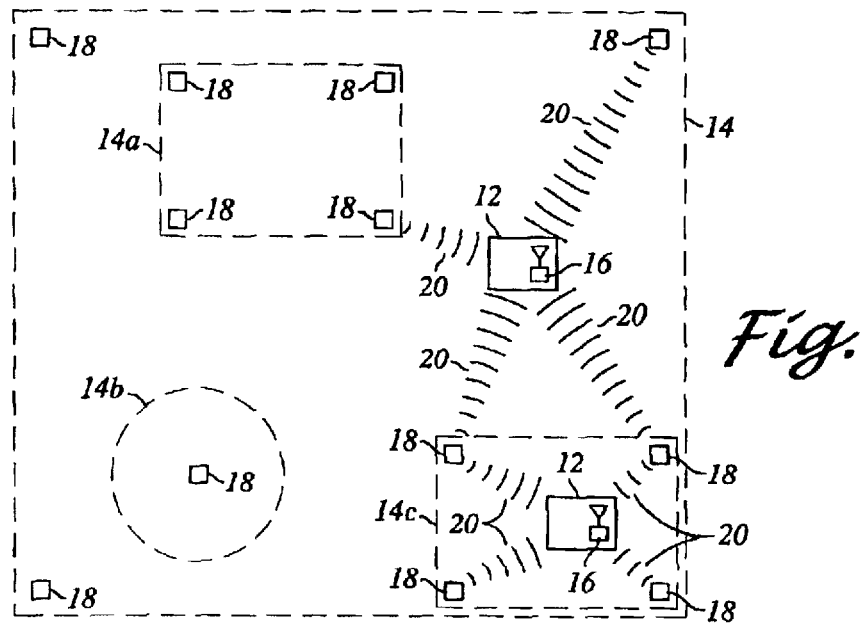
FIG. 1 is a symbolic diagram of transponder tagged items as maintained within boundaries detected by transponder communications devices utilized by a system of the present invention.
Figure 2:
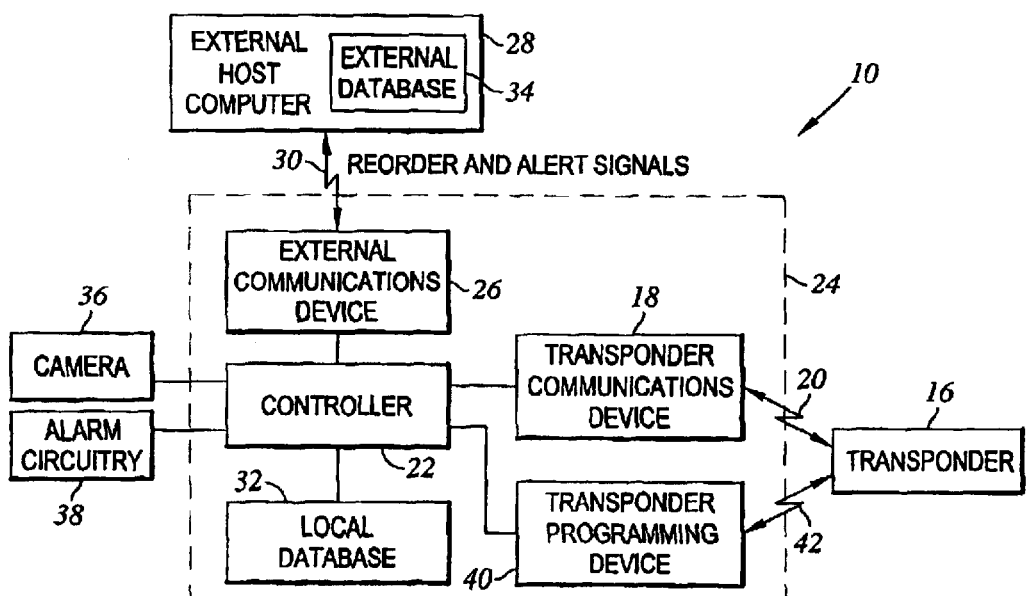
FIG. 2 is a symbolic block diagram of a preferred system of the present invention.

Referring now to the drawings wherein the showings are for purposes of illustrating a preferred embodiment of the present invention only, and not for purposes of limiting the same, FIGS. 1 and 2 illustrate a preferred system and method for implementing the present invention.

According to an aspect of the present invention, there is provided an automated security and reorder system 10 for items 12 maintained within a boundary 14. Importantly, each item 12 has a transponder 16 associated therewith. Each transponder 16 is configured to transmit item identification data. As used herein, the terms item 12, boundary 14, and transponder 16 may be used to indicate both the plural and singular.

In the preferred embodiment of the present invention, the transponder 16 includes programmable integrated circuitry which is disposed in electrical communication with an antenna. The integrated circuitry includes a resonant capacitor arrangement. As one of ordinary skill in the art will appreciate, such an arrangement circumvents the need to provide the transponder 16 with an independent power source (e.g., a battery). This is because the resonant capacitor arrangement allows the transponder 16 to collect energy of a radio frequency field to which it is exposed. In this respect the preferred embodiment of the transponder 16 is passive. Nonetheless an active transponder 16 having a power source may be utilized.

The programmable integrated circuitry has a memory which stores the item identification data. Advantageously, the transponder 16 may be integrated with a label. The transponder 16 may be fabricated by printing conductive non-metallic ink onto a substrate, such as adhesive paper or other non-conductive material. In this form, such transponders 16 are known in the industry as "smart labels" or "RFID" (radio frequency identification) tags. Examples of such label integrated transponders 16 are commercially available under the product names, I.CODE label IC (manufactured by Philips Semiconductors), Tag-it™ Inlays (manufactured by Texas Instruments Incorporated, microID™ RFID Tags (manufactured by Microchip Technology, Inc.), and BiStatix* (manufactured by Motorola, Inc.). As such, the item 12 is "tagged" with the transponder 16. Rather than adhering a transponder 16 integrated with a label onto the item 12, the transponder 16 may simply be placed within the item 12. For example, where the item 12 takes the form of a box containing goods, the transponder 16 may be put within the box. Alternatively, the transponder 16 may be fabricated by printing conductive non-metallic ink directly onto the item 12 to be delivered. It is additionally contemplated that the transponder 16 may even be integrated within product packaging.

The system 10 includes a transponder communications device 18 which is configured to electrically interrogate the transponders 16 as maintained in the boundary 14 and to receive the item identification data in response. As used herein, the term transponder communications device 18 may be used to indicate both the plural and singular. The transponder communications device 18 is configured to establish a transponder data link 20 with a given transponder 16 being interrogated, as symbolically indicated in the figures. It is contemplated that suitable apparatus utilized for the transponder communications device 18 are well known to one of ordinary skill in the art and may be chosen from those which may be commercially available from any manufacturer which manufactures the transponders 16 (e.g., Philips Semiconductors, Texas Instruments Incorporated, Microchip Technology, Inc. and Motorola, Inc.). Further, it is contemplated that suitable techniques and configurations for establishing the transponder data link 20 may be chosen from those which are well known to one of ordinary skill in the art.

It is contemplated that multiple boundaries 14 may be provided, such as sub-boundaries 14a, 14b and 14c as depicted in FIG. 1. Further it is contemplated that such boundaries 14 may be overlapping. Moreover, the boundaries 14 may be two or three-dimensional in nature. It is understood that the boundaries 14 are defined by the configuration of the transponder communication device(s) 18. As one of ordinary skill in the art can appreciate, the transponder communications devices 18 may be calibrated by establishing a threshold signal strength above which indicates a defined proximity between a given transponder communications device 18 and a transponder 16 of a tracked item 12. In this regard, such signal strength thresholds may be used as triggers so as to indicate the tagged item 12 having crossed, leaving or entering, a given boundary 14. Artificial intelligence algorithms may be utilized to assess whether a detected transponder tagged item 12 is leaving or entering a given boundary 14 which may include target motion analysis, for example. The transponder communications devices 18 may be strategically deployed in a central location with respect to a given boundary, or adjacent expected points of entrance and exit in a gate-like arrangement, such as near doorways.

As mentioned above, each transponder 16 is configured to transmit item identification data. The item identification data includes information indicating a secured status and/or a consumable status of the associated item 12. In this regard, the transponder communications devices 18 interrogate the transponders 16 to receive such item identification data therefrom. The system 10 further includes a controller 22 which is disposed in operable communication with the transponder communications device 18. The controller 22 is configured to generate an alert signal in response to detection of a given transponder 16 having crossed a given boundary 14, typically leaving, and having item identification data indicating a secured status of associated item 12. Further, the controller 22 is configured to generate an item reorder signal in response to detection of a given transponder 16 having crossed the boundary and having item identification data indicating a consumable status of the associated item 12. The particular hardware and/or software requirements of the controller 22 may be chosen from those which are well known to one of ordinary skill in the art.

In addition, the system 10 further includes a database, such as a local database 32 or an external database 34, for receiving item reorder signals from the controller 22 for generating an electronic shopping list for reordering of items 12. As such, the database is configured to be in operable communication with the controller 22. The particular hardware and/or software requirements for database may be chosen from those which are well known to one of ordinary skill in the art.

Advantageously, the system 10 is contemplated to be flexible in nature. In one embodiment, the controller 22 is hosted locally generally adjacent the maintained boundary 14, such as by a personal computer 24. In this regard, the controller 22 may be within or outside any given boundary 14. As used herein, the term personal computer includes any of those computing devices which are well known to one of ordinary skill in the art. For example, such computing devices may include desktop computers, laptop computers, terminals, hand-held or palm devices, etc. In such an embodiment, a local database 32 may be provided which is in operable communication with the personal computer 24 hosting the controller 22 for storage of information concerning the item identification data, including the reorder and alert signals and related or derivative data thereof such as the electronic shopping list.

It is noted that FIG. 2 symbolically depicts the controller 22 as only residing or hosted at a personal computer 24. However, such local hosting is not required. In regard, in another arrangement the controller 22 may be hosted by an external host computer 28 (as such, FIG. 2 does not show such controller as residing at the external host computer 28). Moreover, it is contemplated that the controller 22 may be distributed in nature having functional components in both the personal computer 24 and the external host computer 28. Thus the controller 22 may be distributed between local and external computing environments with software/hardware components thereof performing related processing and analyzing tasks. In this regard, some degree of data preprocessing may be performed at the personal computer 24 prior to additional processing being performed at the external host computer 28.

Regardless of where the controller 22 is located, an external database 34 may be provided which is in operable communication with the computer hosting the controller 22 for storage of information concerning the item identification data, including the reorder and alert signals and related or derivative data thereof such as the electronic shopping list. Further, data storage assignments may be distributed as well such as between a local database 32 and an external database 34.

The system 10 may be provided with an external communications device 26. Such a device may be utilized to establish an external data link 30 between the local personal computer 24 and the external host computer 28. As such, the external data link 30 may be used to electronically pass data representative of the generated reorder and alert signals.

In addition, it is contemplated that the external host computer 28 may be accessible through a computer network through the use of the external communications device 26. While the computer network is preferably what is currently understood as the Internet, other computer network arrangements may be included, such as local area networks (LANs), intranets, extranets, private networks, virtual private networks, integrated services digital networks (ISDNs), etc. The particular hardware and/or software requirements for the external communications device 26 and the establishment of the external data link 30 therewith may be chosen from those which are well known to one of ordinary skill in the art, and may include usage of telephony based systems, cable, Digital Subscriber Lines (DSL) and variations thereof, wire, optical communications (including infrared), and wireless forms of communications, such as those based upon cellular, satellite, radio frequency (RF) and other forms of electromagnetic wave based mediums. In the case where the computer network is the Internet, it is contemplated that external host computer 28 may be interfaced or hosted at a web address. To the extent that the controller 22 is hosted at the external host computer 28, such an arrangement may be operated by an application service provider (ASP).

Advantageously, it is recognized that transponder technology may facilitate a read/write capability of the transponders 16. As such, the system 10 may further include a transponder programming device 40 for updating the identification data stored therein. Thus, the transponder programming device 40 may be disposed in operable relation with the controller 22 and configured to establish a data link 42 with the desired ones of the transponders 16. It is contemplated that suitable apparatus utilized for the transponder programming device 40 are well known to one of ordinary skill in the art and may be chosen from those which may be commercially available from any manufacturer which manufactures the transponders 16. Further, it is contemplated that suitable techniques and configurations for establishing the data link 42 may be chosen from those which are well known to one of ordinary skill in the art.

As mentioned above, the transponders include identifying information as to whether a given item 12 is of a consumable nature. For example, the system 10 may be deployed in a home environment, with designated items 12 having a consumable status such as specific food items, paper towels, soap, light bulbs, etc. In this regard, a detection event that such items 12 have crossed a particular boundary 14 may be used to trigger the automatic addition of a similar item 12 onto an electronic shopping list for reordering. In this regard, reorder signals may be generated by the controller 22 and passed to the local database 32 and/or the external database 34. Such reorder signals may be utilized to generate, amend or otherwise update an electronic shopping list which also may be stored in the local database 32 and/or the external database 34.

It is contemplated that the electronic shopping list may be utilized for the reordering of item 12 which have been presumably consumed in the ordinary course of utilization. As such, the electronic shopping list may conveniently be assessed via a computer network, such as the Internet. In practice, such a electronic shopping list may be interfaced with other software such as that which may be provided by an e-commerce provider of items for sale. In another usage, a consumer may physically be shopping in a grocery store for example. The consumer is contemplated to be able to access and even update the electronic shopping list via a data link established with a hand-held computer or palm device.

At the same time that the system 10 is providing useful inventory and reordering functionality, the present invention recognizes that the detection of the transponders 16 may be used to track valuable items 12 that are not intended to leave a given deployed boundary 14. For example, in the home environment, certain items 12 which may be tagged and monitored for this purpose may include appliances, furniture and other valuables. As such, while the items 12 stored in a refrigerator (yet another item 12) may be tracked and classified as being a consumable, the refrigerator itself may be affixed with a transponder 16 having a secured status. Thus, the detection of an unauthorized removal of a tagged item 12 may be used to trigger an alarm or even may be electronically linked to traditional alarm or security systems utilizing security devices such as a camera 36 and alarm circuitry 38. Such alarm circuitry 38 may control the camera 36 as well as other devices such as audible alarms, flashing lights, automatic communications with physical security personnel or law enforcement, access control, etc.

The system 10 may have useful application in other environments as well. For example, in the office environment, items 12 tracked having a consumable status may include packages of pens, notepads, paper, etc. Whereas, office furniture, computers and other office equipment may be tagged with transponders 16 indicating a secured status thereof. In another example, the system 10 may be deployed in a hospital environment with items 12 cracked having a consumable status may include packages of needles, bandages, gloves, drugs, etc. Whereas expensive medical equipment may be tracked with a secured status. It is even contemplated chat unique items 12 such as particular diagnostic or treatment apparatus may be tracked within a particular boundary 14 for facilitating urgent identification of the location of the same.

The present invention further includes an automated 5 method of securing and reordering items 12 maintained within a boundary 14. The method includes establishing the transponder data link 20 between the transponders 16 and a transponder communications device 18 located adjacent the boundary 14. The method further includes electrically interrogating the transponders 16 and receiving the item identification data in response via the transponder data link 20. The method further includes generating an alert signal in response to detection of a given transponder 16 having crossed the boundary 14 and having item identification data indicating a secured status of the item 12 associated therewith. The method further includes generating an item reorder signal in response to detection of a given transponder 12 having crossed the boundary 14 and having item identification data indicating a consumable status of the item associated therewith. An electronic shopping list may be based upon the received item reorder signals. The electronic shopping list may be accessed via a global computer network, such as the Internet. Moreover, the electronic shopping list may be transmitted via such computer network. This may be in the case where the electronic shopping list is forwarded to an on-line vendor, for example.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. An automated security and reorder system for items maintained within a boundary, each item having an associated transponder, each transponder being configured to transmit item identification data for indicating a secured status and a consumable status of the associated item, the system comprising:

a transponder communications device configured to electrically interrogate a transponder associated with an item maintained within the boundary and to receive item identification data in response;

a controller disposed in operable communication with the transponder communications device, the controller being configured to generate an alert signal in response to detection of a given transponder having crossed the boundary and having item identification data indicating a secured status of the associated item, the controller being configured to generate an item reorder signal in response to detection of a given transponder having crossed the boundary and having item identification data indicating a consumable status of the associated item; and a database for receiving item reorder signals from the controller for generating an electronic shopping list for reordering of items.

2. The security and reorder system of claim 1 wherein the controller is hosted by a personal computer disposed adjacent the boundary.

3. The security and reorder system of claim 1 further comprises an external communications device in electrical communication with the controller for transmitting generated alert signals therefrom.

4. The security and reorder system of claim 3 wherein the external communications device is configured to transmit the generated alert signals via a global computer network.

5. The security and reorder system of claim 1 further comprises an external communications device in electrical communication with the controller for transmitting generated reorder signals therefrom.

6. The security and reorder system of claim 5 wherein the external communications device is configured to transmit the generated reorder signals via a global computer network.

7. The security and reorder system of claim 1 wherein the controller is hosted by an external host computer.

8. The security and reorder system of claim 7 further comprises an external communications device in electrical communication with the transponder communications device for transmitting a signal representative of the item identification data to the controller.

9. The security and reorder system of claim 8 wherein the transponder communications device is configured to communicate with the controller via a global computer network.

10. The security and reorder system of claim 1 wherein the database is hosted by a personal computer disposed adjacent the boundary.

11. The security and reorder system of claim 1 wherein the database is hosted by an external host computer.

12. The security and reorder system of claim 1 wherein the database is accessible via a global computer network.

13. The security and reorder system of claim 1 further comprises a camera configured to capture an image adjacent the boundary, the camera is in electrical communication with the controller.

14. The security and reorder system of claim 1 further comprises an alarm disposed adjacent the boundary, the alarm is in electrical communication with the controller.

15. The security and reorder system of claim 1 wherein the controller is configured to detect a given transponder having crossed the boundary by a failure to receive a response therefrom.

16. The security and reorder system of claim 1 wherein the controller is configured to detect a given transponder having crossed the boundary by receiving a response therefrom.

17. The security and reorder system of claim 1 wherein the transponder communications device includes multiple devices.

18. The security and reorder system of claim 1 wherein the boundary includes multiple boundaries, and the controller is configured to generate the alert signal in response to detection of a given transponder having crossed a selected one of the boundaries.

19. The security and reorder system of claim 1 wherein the boundary includes multiple boundaries, and the controller is configured to generate the item reorder signal in response to detection of a giver transponder having crossed a selected one of the boundaries.

20. The security and reorder system of claim 1 wherein the transponders are passive radio frequency devices.

21. The security and reorder system of claim 20 further comprising a transponder programming device configured to transmit electrical signals to the transponders for updating the item identification data thereof.

22. An automated method of securing and reordering items maintained within a boundary, each item having an associated transponder, each transponder being configured to transmit item identification data for indicating a secured status and a consumable status of the associated item, the method comprising the steps of:

(a) establishing a transponder data link between the transponders and a transponder communications device located adjacent the boundary;

(b) electrically interrogating the transponders and receiving the item identification data in response via the transponder data link;

(c) generating an alert signal in response to detection of a given transponder having crossed the boundary and having item identification data indicating a secured status of the item associated therewith; and (d) generating an item reorder signal in response to detection of a given transponder having crossed the boundary and having item identification data indicating a consumable status of the item associated therewith.

23. The method of claim 22 wherein step (d) includes transmitting the item reorder signal via a global computer network.

24. The method of claim 22 further comprises the step of:

(e) generating an electronic shopping list based upon the received item reorder signals.

25. The method of claim 24 wherein step (e) includes accessing the electronic shopping list via a global computer network.

26. The method of claim 24 wherein step (e) includes transmitting the electronic shopping list via a global computer network.

27. The method of claim 22 wherein the boundary includes multiple boundaries, and step (c) includes generating the alert signal in response to detection of a given transponder having crossed a selected one of the boundaries.

28. The method of claim 22 wherein the boundary includes multiple boundaries, and step (d) includes generating the item reorder signal in response to detection ponder having crossed a selected one of the boundaries.

* * * * *